United States Patent [19]

Deslyper et al.

[11] Patent Number: 6,063,521
[45] Date of Patent: May 16, 2000

[54] BATTERY CELL HOUSING

[75] Inventors: Amy T. Deslyper, Dacula, Ga.; Brian Jon Hassemer, Gurnee; Mark Daniel Janninck, Elmhurst, both of Ill.; James D. Domoleczny, Sr., Duluth, Ga.

[73] Assignee: Motorola, Inc., Schaumburg, Ill.

[21] Appl. No.: 09/032,815

[22] Filed: Mar. 2, 1998

[51] Int. Cl.$^7$ ...................................................... H01M 2/00
[52] U.S. Cl. ........................ 429/163; 429/100; 429/164; 429/176
[58] Field of Search ................................. 429/100, 163, 429/164, 176

[56] References Cited

U.S. PATENT DOCUMENTS

| | | | |
|---|---|---|---|
| 4,223,076 | 9/1980 | Terada | 429/96 |
| 4,532,194 | 7/1985 | Liautaud et al. | 429/99 |
| 5,455,737 | 10/1995 | Ogami et al. | 361/680 |
| 5,645,954 | 7/1997 | Tamaru | 429/100 |

*Primary Examiner*—Maria Nuzzolillo
*Assistant Examiner*—Raymond Alejandro
*Attorney, Agent, or Firm*—Felipe J. Farley; Philip H. Burrus, IV

[57] ABSTRACT

A one-piece housing for a rectangular battery cell with circuitry disposed on its side is described. The top side of the housing is a protective ledge, covering only the circuitry disposed on the side of the battery cell, where the ledge lies in or below the imaginary plane formed by the top surface of the cell. The housing protects the battery circuitry, is easier to manufacture than a two-part housing, is lighter than a two-part housing, and has a lower profile.

8 Claims, 2 Drawing Sheets

FIG. 5 *(PRIOR ART)*

BATTERY CELL HOUSING

TECHNICAL FIELD

This invention relates in general to the field of battery housings.

BACKGROUND OF THE INVENTION

Nearly forty million Americans now use a cellular phone, and about seven million persons are expected to subscribe to cellular service this year. Cellular phone stores and kiosks are opening on major thoroughfares and malls throughout the United States, and the cellular telephone business may be growing faster than that of fax machines, cable television, and videocassette recorders. The growth of the fourteen-year old cellular telephone industry has paralleled the reduction in the size of the cellular telephones themselves. Thus, consumers have become accustomed to the convenience and portability of cellular telephones. They have demanded that those cellular telephones become even more convenient and even more portable. A current leader in style and portability is the Motorola StarTAC®. However, to improve even on this gold standard, all components in the cellular telephone must be reduced in size. This includes the all-important battery pack powering the telephone, and the housing of the battery pack. Many different designs for a battery pack housing have been proposed, but none have proven fully satisfactory. Therefore, there is a need for an improved battery pack housing.

BRIEF DESCRIPTION OF THE DRAWINGS

FIG. 5 shows a cell with circuitry disposed on one side seated in a prior art 2-part cell housing.

DETAILED DESCRIPTION OF THE PREFERRED EMBODIMENT

The present invention is a one-piece housing which protects circuitry disposed along the side of the cell. The circuitry is covered by a ledge which lies in the plane formed by the top surface of the cell, or below the plane formed by the top surface of the cell. The housing thus restrains the cell, protects the circuitry disposed on the side of the cell, and has a top profile no higher than the top surface of the cell.

The constant thrust in cellular telephone design and in portable electronic devices in general, is to make them as small as possible. In order to accomplish this, every aspect of a portable electronic device must be redesigned. Since most portable electronic devices are powered by batteries, this also entails a redesign of the battery and its concomitant housing. In many battery applications, the battery pack must meet stringent size restrictions and, of course, if the device is to be as light as possible, the battery and its housing should be as light as possible. The present invention provides a solution to this dilemma by providing a one-piece battery housing, which also provides protection to battery circuitry disposed on the size of the battery.

Figure 2:
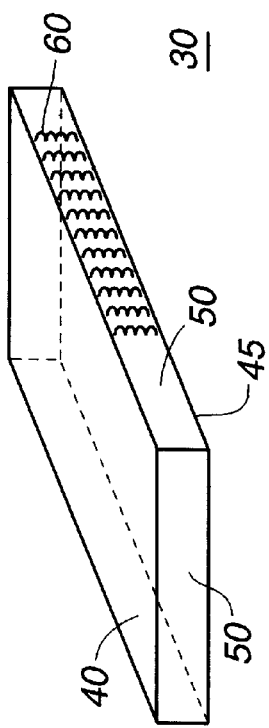
FIG. 2 is a perspective view of a rectangular cell with circuitry disposed on one side of the cell.

FIG. 2 is a perspective view of a typical cellular telephone cell (30). The cell 30 has a top surface (40), a bottom surface (45) and four sides (50). Disposed on one side (50) of the cell (30) is circuitry (60). This circuitry (60) is required in many cells with advanced chemistries such as lithium-ion cells. This circuitry (60) is necessary in those cells to prevent run-away chemical reactions.

FIG. 5 shows a typical prior art two-part cell housing (90). The cell (30) is placed in the two-part housing (90) and the two parts of the housing are joined together. The two-part housing may be joined in a variety of ways: by gluing, ultrasonic welding, heat staking, or snap-locks, or by wrapping a label around the two parts. Such housings have a tendency to come apart. If such a two-part housing were to be pried apart by a curious end user or a curious child, there would be no assurance the circuitry would not be damaged by this act. Furthermore, having a housing on the top and bottom of a cell increases the dimensions of a battery cell pack and increases its weight.

Figure 1:
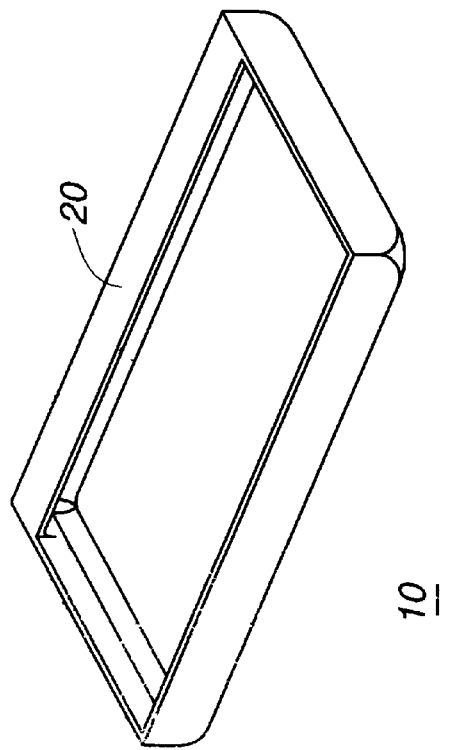
FIG. 1 is a perspective view of the one-piece battery housing of the present invention.
Figure 4:
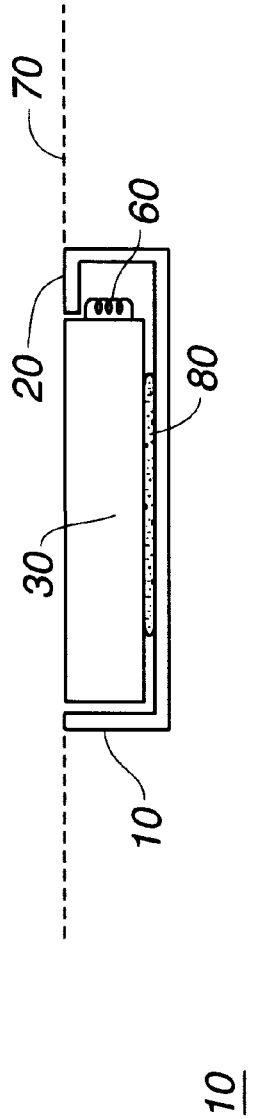
FIG. 4 is an end cutaway view of a cell circuitry disposed on its side in the battery housing of the present invention.
Figure 3:
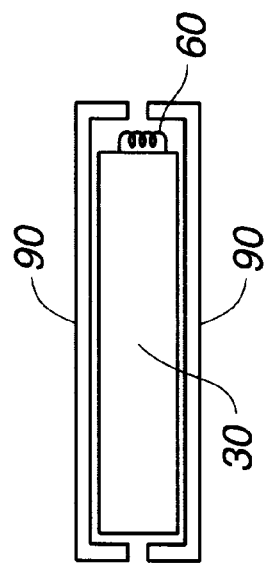
FIG. 3 is an end cutaway view of the battery housing of the present invention.
Figure 3:
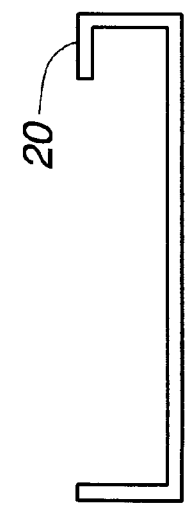

FIG. 1 is a perspective view of the one-part housing (10) of the current invention, showing the ledge (20). This housing (10) is shown from an end cut-away view in FIG. 3 which also shows the ledge (20). FIG. 4 is an cut-away end view of a cell (30) seated in the housing (10) of the present invention. The circuitry (60) lies beneath the ledge (20) which protects it. This ledge (20) lies in or below the imaginary plane (70) formed by the top surface of the cell (30). Adhesive (80) in one embodiment of the invention, secures bottom surface (45) of the cell to the housing (10). Ledge (20) extends over circuitry (60) far enough that circuitry (60) might not even be visible from a top view. Applicants have found that a one piece housing (10) can secure cell (30) just as well as a prior art two-part housing (90) while protecting circuitry (60) far better, and providing a lower top profile. Furthermore, since the present invention is a one-part housing, it is easier to manufacture than a two-part housing, and eliminates an assembly step. This reduces manufacturing errors. The present invention encompasses any housing for a battery with circuitry disposed on the side of the battery, where reduced weight and profile of the assemblage are important. Imagine the circuitry on the side of a cell to be completely contained in an imaginary box or a series of imaginary boxes, like the cars of a train. These boxes have a top surface, sides, and a bottom surface. Imagine this cell and its circuitry, to be in a housing. Suppose this housing is in the xyz coordinate plane, with the bottom surface of the housing resting in the xy coordinate plane. Imagine the top surface of the imaginary boxes completely containing the battery circuitry to be parallel to the xy coordinate plane, some distance above the xy coordinate plane. The housing of the present invention can be imagined to cover the top surface, bottom surface and sides (excepting the side of the circuitry joined to the cell) of the imaginary boxes encompassing the circuitry, while no point on the top surface of the housing has a z coordinate greater than the z coordinate of any point in the top surface of the cell.

In one embodiment of the invention, the one-piece housing is formed from plastic by injection molding. However, any other suitable material, such as rubber, or metal, could be used.

In one embodiment the present invention has been described in terms of a rectangular cell. In another embodiment the invention is a housing for any flat cell with circuitry disposed on its side. In another embodiment of the invention, the housing is for a flat cell, with circuitry disposed on two or more sides of the cell. In such a cell, there would be two or more ledges, each ledge lying in or below the imaginary plane formed by the top surface of the cell. In another embodiment of the invention, the housing is for any shape of cell with circuitry disposed on its side.

EXAMPLE I

A one-piece housing was injected molded by polycarbonate. The housing measured 50 millimeters by 35 millimeters by 7 millimeters and the ledge was 4 millimeters wide. A rectangular cell with slightly smaller dimensions was secured into place, with its circuitry lying beneath the ledge. A manufacturer's label was wrapped around the housing for cosmetic purposes. The housing gripped the cell securely, and brief shaking by hand could not loosen the cell. Furthermore, the circuitry at the side of the cell could not be touched or poked. The profile of the battery was low: the top surface of the battery housing lay in the same imaginary plane as the top surface of the cell.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A one piece housing for a battery cell with circuitry disposed along the side of the battery cell in which the housing covers the circuitry and the top surface of the housing lie no higher than the top surface of the battery cell.

2. The housing of claim 1, wherein the top surface of the housing is lower than every point along the top surface of the battery cell.

3. The housing of claim 1, wherein the battery cell is selected from the group consisting of flat cells, rectangular cells, and round cells.

4. The housing of claim 1, wherein the circuitry lies along one or more sides of the battery cell.

5. The housing of claim 1, wherein the housing is made of plastic, rubber, or metal.

6. A battery comprising the housing of claim 1.

7. An electronic device comprising the housing for a battery cell of claim 1.

8. The electronic device of claim 7, wherein the electronic device is a cellular telephone.

* * * * *